J. W. MENHALL & C. G. CLEMENT.
FIFTH WHEEL FOR TRAILERS OR THE LIKE.
APPLICATION FILED SEPT. 10, 1917.
1,261,261.
Patented Apr. 2, 1918.
3 SHEETS—SHEET 1.
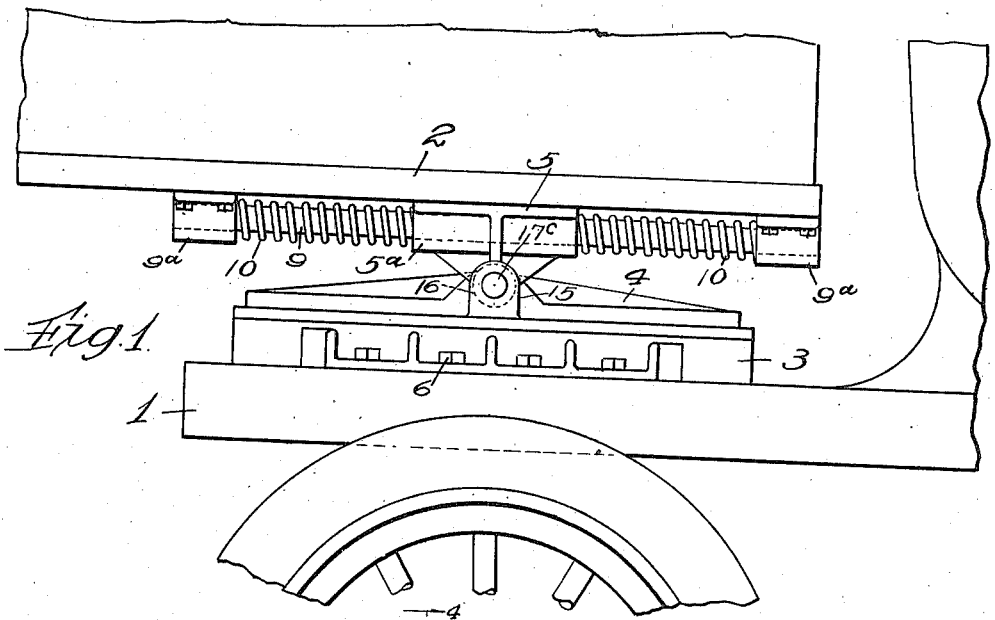
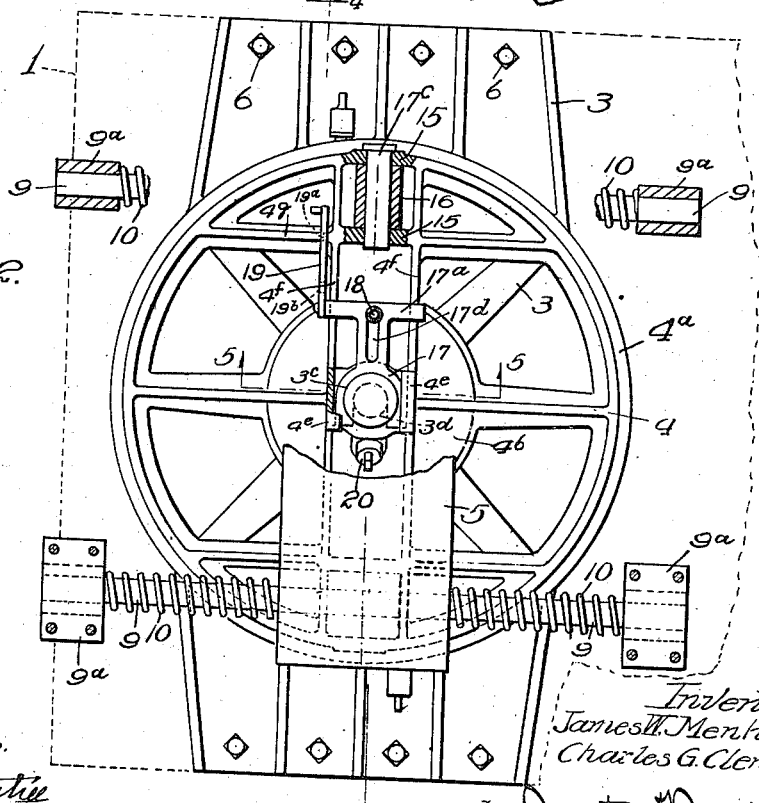

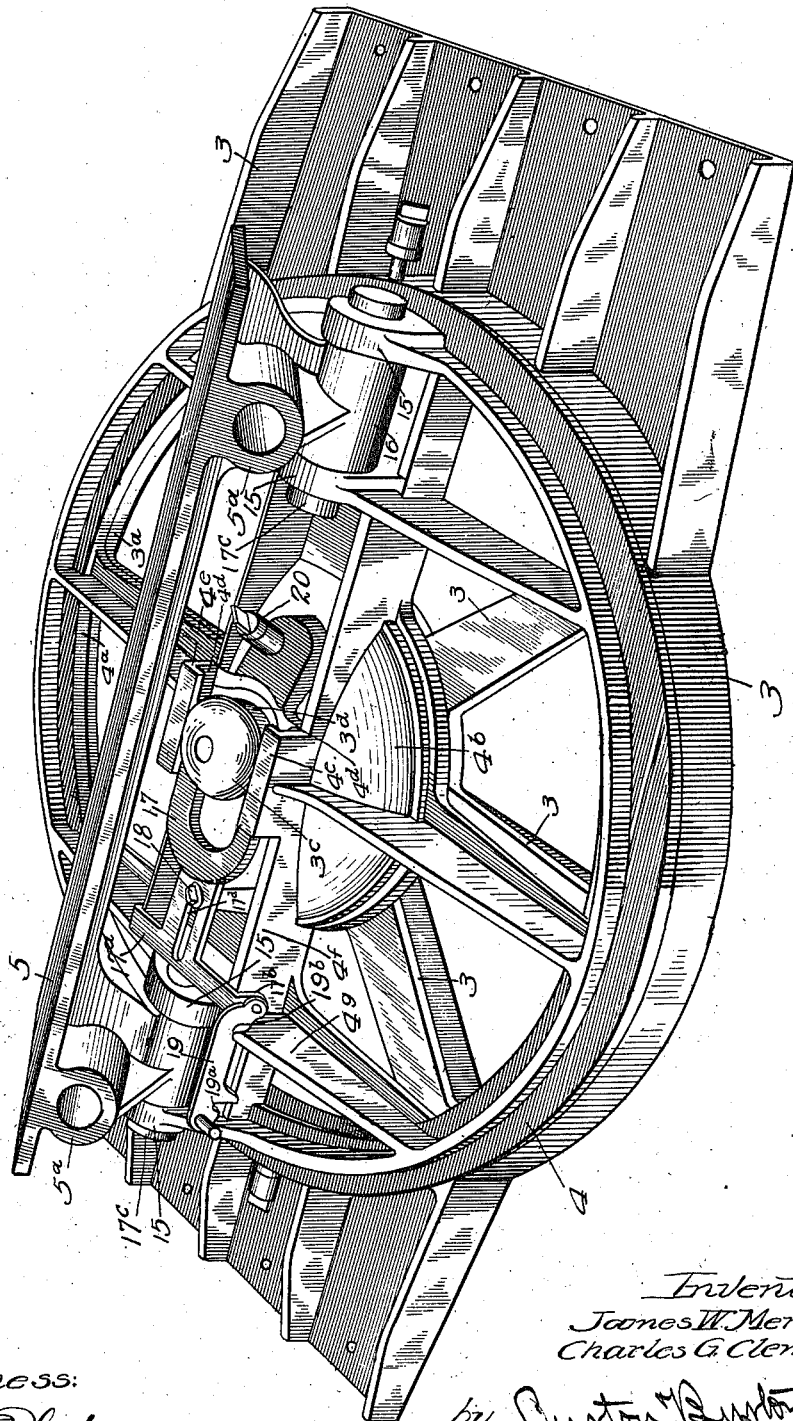

J. W. MENHALL & C. G. CLEMENT.
FIFTH WHEEL FOR TRAILERS OR THE LIKE.
APPLICATION FILED SEPT. 10, 1917.
1,261,261.
Patented Apr. 2, 1918.
3 SHEETS—SHEET 3.
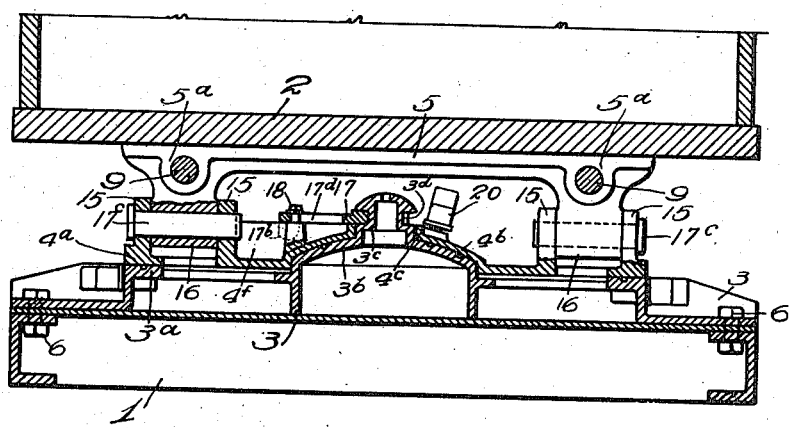
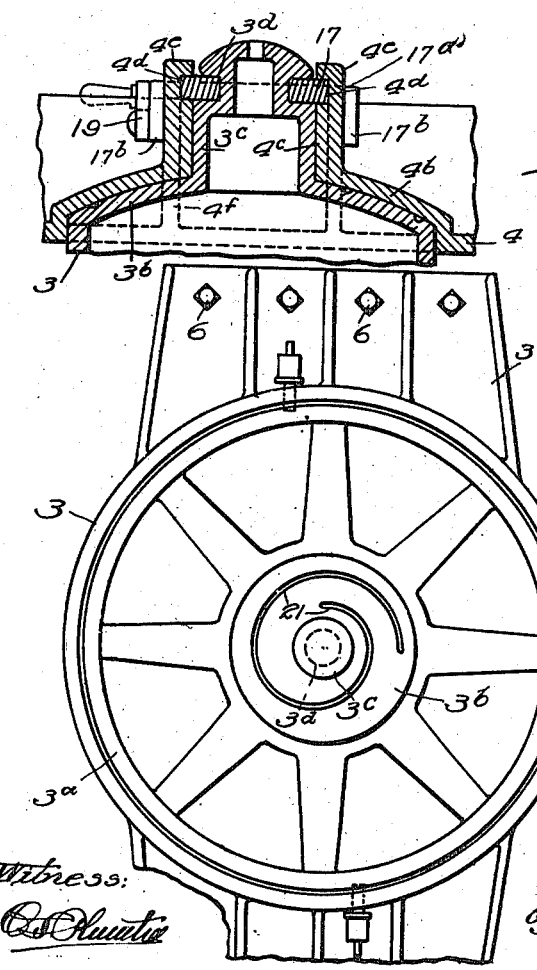
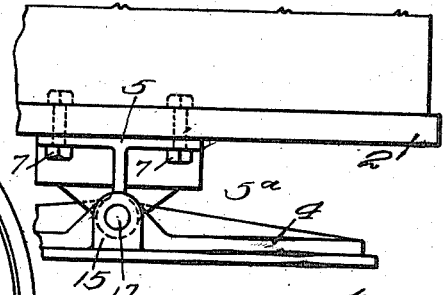

UNITED STATES PATENT OFFICE.

JAMES W. MENHALL AND CHARLES G. CLEMENT, OF EDGERTON, WISCONSIN, ASSIGNORS TO HIGHWAY TRAILER COMPANY, OF EDGERTON, WISCONSIN, A CORPORATION OF WISCONSIN.

FIFTH-WHEEL FOR TRAILERS OR THE LIKE.

1,261,261.    Specification of Letters Patent.    Patented Apr. 2, 1918.

Application filed September 10, 1917. Serial No. 190,478.

*To all whom it may concern:*

Be it known that we, JAMES W. MENHALL and CHARLES G. CLEMENT, residing at Edgerton, in the county of Rock and State of Wisconsin, have invented new and useful Improvements in Fifth-Wheels for Trailers or the like, of which the following is a specification, reference being had to the accompanying drawings, forming a part thereof.

The purpose of this invention is to provide an improved construction of a fifth wheel, particularly adapted for a trailer for connection of a tractor therewith. It consists in the elements and features of construction shown and described as indicated in the claims.

In the drawings:

Figure 1 is a side elevation of the forward portion of a trailer frame and the rear portion of a tractor frame, connected together by a fifth wheel embodying this invention.

Fig. 2 is a top plan of the same with part of the trailer frame structure broken away to disclose the relative positions of the members of the fifth wheel device.

Fig. 3 is a perspective view of the fifth wheel device detached from both the trailer and the tractor.

Fig. 4 is a vertical section at the line, 4—4, on Fig. 2.

Fig. 5 is a vertical section at the line, 5—5, on Fig. 2.

Fig. 6 is a plan view of the lower member of the fifth wheel.

Fig. 7 is a detail plan elevation showing the rocking pivotal connection between two parts of the upper member of the fifth wheel.

In the drawings Fig. 1 is a main transverse frame bar of the tractor with which the lower member of the fifth wheel is made fast. 2 is a main transverse bar or base plank of the trailer on which the trailer member of the fifth wheel is mounted. 3 is the lower member of the fifth wheel, mounted upon the upper side of the tractor frame bar. 4 and 5 are the two main parts of the trailer member of the fifth wheel, mounted by means of the upper of said part, 5, upon the under side of the trailer frame bar or plank, 2. Any secure method of fastening the fifth wheel member, 3, firmly to the tractor frame structure may be employed, such as the bolts, 6, shown in the drawings. The upper or trailer member of the fifth wheel may have its upper part, 5, to which the lower part is transversely pivoted, as hereinafter more particularly explained, mounted upon the under side of the trailer frame structure, either rigidly, as by bolts, 7, or slidably between springs yieldingly resisting the sliding movement in the direction fore-and-aft, as by means of the slide bearing rods, 9, 9, extending through the longitudinally directed eyes, 5ª, formed in said part, 5, the slide rods, 9, being mounted rigidly on the under side of said trailer frame bar, 2, by means of brackets, 9ª, which also constitute stops for the springs, 10, coiled about said slide rods at opposite ends of the eyes, 5ª, the said springs occupying the entire distance between the eyes respectively and the brackets, 10, which stop the opposite ends of the springs, so that the fifth wheel part, 5, is positioned midway between the said stops yieldingly, that is, so that it is movable in either direction from said mid-position against the resistance of the springs at the side toward which it is moved. The part, 5, of the trailer fifth wheel member is pivoted to the part, 4, of said trailer fifth wheel member, transversely of the line of draft for relative rocking of said two parts of the fifth wheel member in a vertical fore-and-aft plane for the purpose of accommodating the trailer to variations of slope of the road over which it is drawn, so that the tractor rear wheels may at all times be on the ground, notwithstanding such variations of slope caused by hills and hollows in the road. The pivotal joint is made in the trailer member of the fifth wheel, rather than in the tractor member thereof, so that in turning corners wrich may occur at hollows or depressions in the road, when by reason of the change of direction of travel, the tractor, for the time occupied in making the turn, would be standing or moving in a direction approximately at right angles to that of the trailer, the trailer with its load shall not be tipped sideward, as would be the case if the joint for accommodating the slope of the road were in the tractor member of the fifth wheel. In order that the pivotal connection of the two parts of the upper or trailer member of the fifth wheel may be as stable as possible, it is desirable to have the pivots as wide spread as they can be made within the limits of the fifth wheel, and for this purpose these pivotal connections are made by means of two pairs of lugs, 15, 15, positioned near the outer circumference of said lower part, 4, of the upper or trailer member of the fifth wheel. With these pairs of lugs respectively downwardly-projecting lugs 16, 16, from the upper part, 5, of said fifth wheel member are engaged, and there connected by pivot bolts, 17. The same lugs, 16, are made of suitable length and form to afford place for the eyes, $5^a$, above mentioned, by which said part, 5, is mounted on the slide rods, these slide bearings being preferably as wide-spread as possible within the range of the fifth wheel. The two fifth-wheel members, 3 and 4, having the customary annular tracks, $3^a$ and $4^a$, for bearing upon each other at the outer circumferences of said members, have a central bearing upon each other which is designed to principally bear the load, the outer circumferential tracks serving the purpose of checks as usual. For this central bearing the lower member, 3, has an upwardly-projecting spheroidal boss, $3^b$, at the center of which there is a further upwardly-projecting stud, $3^c$, and the lower part, 4, of the upper fifth wheel member has a correlatively formed spherodial recess, $4^b$, in its lower surface, seating upon said spheroidal boss, $3^b$, and at the center of said spheroidal recess said member, 4, has a socket or aperture, $4^c$, to receive the stud, $3^c$, whereby the two members, 3 and 4 are pivoted together at their centers for the relative horizontal movement which is necessary. A particular advantage of the spheroidal form of the central bearings of these two members upon each other is that in entering the pivot stud, $3^c$, into its socket bearing, $4^c$, when connecting the tractor and the trailer, it is not necessary for the operator to accurately locate the two parts relatively, but on the contrary, if the stud, $3^c$, strikes anywhere within the spheroidal recess, $4^b$, of the member, 4, the slope of said recess will cause the stud to slide to the center and enter the socket or aperture, $4^c$, the operator assisting, if necessary, by a little jolting movement of the parts. This operation is further facilitated by furnishing the upper end of the stud, $3^c$, with a convex spheroidal surface which will slide easily upon the concave spheroidal surface of the recess, $4^b$.

For the purpose of securing the two members of the fifth wheel together after they are pivotally engaged as described, the pivot stud, $3^c$, is provided near its upper end with an annular groove, $3^d$. In the plane of that groove there are provided in the inner faces of lugs, $4^e$, which project up from the part, 4, at opposite sides of the aperture, $4^c$, slideways, $4^d$; and on the upper side of said part, 4, there is mounted a forked slide, 17, whose fork arms engage respectively at opposite sides of the stud, $3^b$, in the annular groove, $3^d$, and in the slideways, $4^d$, mentioned, said fork thus serving by its fork arms as a key to lock the parts, 3 and 4, together, with freedom for their relative rotary movement about the stud, $3^c$. The forked slide, 17, is further guided and retained in place by means of a cross-head, $17^a$, having its ends bent down as shown at $17^b$, for engagement outside of the parallel stiffening ribs, $4^f$, of the member, 4, and said forked slide has in its stem a slot, $17^d$, through which a bolt, 18, is inserted and screwed into the part, 4, with a washer under its head for retaining the forked slide in position. For manipulating the forked slide for locking and unlocking the parts, it is provided with a latch, 19, which is conveniently pivoted to one of the down-bent ends or lugs, $17^b$, of the crosshead, and extends out laterally over the upper side of the part, 4, so as to be in convenient reach for manipulation by the operator. This latch has notches, $19^a$, $19^b$, which are adapted to engage with the stiffening ribs, $4^g$, of the part, 4, for securing the forked slide respectively in locking and unlocking position.

As stated, the principal bearing of the two relatively rotatable fifth-wheel members upon each other, is afforded by the spheroidal boss and recess with which they are respectively provided about the center, and lubrication for this principal bearing is provided by means of an oil cup, 20, screwed into a proper oil inlet opening in the upper side of the part, 4, near the crown of the spheroidal boss and recess; and said spheroidal boss is provided with a helical groove, 21, for receiving distributing and storing the lubricant furnished from the oil cup.

We claim:—

1. A fifth wheel for a trailer or the like, comprising a lower member having a central pivot stud and an upper member having a socket to receive the stud; a slideway adjacent to the socket at the upper side of said upper member; a forked slide operating in said slideway, the stud having an annular groove in the plane of such slideway, each fork arm of the forked slide engaging with the slideway and with said groove for locking the fifth-wheel members together.

2. A fifth wheel for a trailer or the like, comprising an upper and a lower member, the lower member having a central pivot stud and the upper member having a socket to receive said stud, the stud having an annular groove and the upper fifth-wheel member having a slideway in the plane of said groove, a key sliding in said slideway and engaging said grooves to lock the members together, and a latch connected to the key and extending out over the fifth-wheel member for manual operation of the key, said latch and the upper fifth-wheel member having coöperating features for engagement of the latch with said member at engaged and disengaged positions of the key.

3. A fifth wheel for a trailer or the like, comprising a lower member for attachment to a tractor, and an upper member for attachment to the trailer, said upper member comprising two parts pivoted transversely of the trailer for relative rocking in a vertical fore-and-aft plane, said parts having at widely separate points above the pivot axis two longitudinally-extending eyes; parallel rods mounted upon the under side of the trailer frame with which said eyes are engaged for sliding of said upper member thereon in a fore-and-aft direction; coiled springs on said rods in front of and behind said eyes, and stops for said springs at their ends respectively opposite the eyes.

In testimony whereof, we have hereunto set our hands at Edgerton, Wis., this 7th day of Sept., 1917.

JAMES W. MENHALL.
CHARLES G. CLEMENT.